3,810,849
MOLYBDENUM OXALATE-ANION EXCHANGE RESIN CATALYST
Stephen N. Massie, Palatine, Ill., assignor to Universal Oil Products Company, Des Plaines, Ill.
No Drawing. Filed Sept. 28, 1972, Ser. No. 293,247
Int. Cl. C07c 29/02; C08f 19/20, 27/04
U.S. Cl. 260—2.1 E                    2 Claims

ABSTRACT OF THE DISCLOSURE

Macromolecular catalysts as exemplified by molybdenum (VI) oxalate chemically bonded to an anion exchange resin is an active catalyst for the reaction of water with olefins to form alcohols.

---

This invention relates to macromolecular organometallic catalysts and to a method for the preparation thereof. More specifically the invention relates to molybdenum compounds chemically bonded to anion exchange resins.

Soluble organometallic catalysts such as molybdenum (VI) oxalate, $H_2(MoO_3C_2O_4)(H_2O)$, an acidic complex of molybdenum in its highest oxidation state, are well known to be active catalysts for the reaction of olefins with various other compounds such as water to form compounds which are useful in the chemical industry. For example, isopropyl alcohol is an important compound in the chemical industry being used as the solvent for oils, alkaloids, gums, resins, as an anti-stalling agent in liquid fuels or as a de-icing agent in liquid fuels as well as being an intermediate in the preparation of pharmaceuticals, perfumes, lacquers, etc. Ethyl alcohol is well known as a fairly common compound which is used in the manufacture of dyes, synthetic drugs, synthetic rubbers, detergents, cosmetics, pharmaceuticals, explosives, etc.

It is therefore an object of this invention to provide a catalyst which may be used in a process for the preparation of alcohols.

A further object of this invention is to provide a solid catalyst which will permit a process for preparing alcohols to be effected in a relatively easier way with a correspondingly lower cost of production of the desired products.

In one aspect an embodiment of this invention resides in a catalytic composition of matter comprising molybdenum (VI) oxalate chemically bonded to an anion exchange resin.

Another aspect of this invention resides in a process for the preparation of a catalytic composition of matter which comprises contacting an aqueous solution of molybdenum (VI) oxalate with an anion exchange resin at a temperature of from about ambient to about 100° C., thereafter washing said resin free of soluble molybdenum compound, drying, and recovering the resultant solid catalytic composition of matter.

Other objects and embodiments will be found in the following further detailed description of the present invention.

As hereinbefore set forth the present invention is concerned with a macromolecular organometallic catalyst as exemplified by molybdenum (VI) oxalate chemically bonded on a polymer, and particularly an anion exchange resin. Heretofore, when utilizing a catalyst such as molybdenum (VI) oxalate per se as the activating agent for the addition of water to an olefin to form alcohols, it has been found that the molybdenum (VI) oxalate dissolves in the reaction medium. If this type of catalyst is to be used in a large scale operation or reaction, it would pose some difficulties in that the catalyst would have to be separated from the product by extraneous means and would therefore cause some difficulty in recovery of the pure product. This would therefore result in an increased cost of production of the desired compounds inasmuch as said recovery system or separation system would be more complex. However, by utilizing the macromolecular organometallic catalyst of the present invention, it is possible to utilize the catalytic composition of matter in such a manner so that the separation of the catalyst from the product could be effected by simple physical means such as filtration rather than the complex means such as fractional distillation, crystallization, addition of other chemicals, etc., which would be required if the catalyst were soluble in the reaction medium.

The catalytic composition of matter of the present invention may be prepared by contacting an aqueous solution of molybdenum (VI) oxalate with an anion exchange resin. A specific example of the type of anion exchange resin which may be used comprises a styrene-divinylbenzene copolymeric matrix system such as various amine substituted styrenedivinylbenzene copolymeric systems. Generally speaking, the ion exchange resins will contain a surface area of from 1 to about 500 square meters per gram. As examples of these anion exchange resins, it is possible to utilize as the support for the catalyst, those anion exchange resins which are sold under the trade names of Dowex 11, Dowex 1–X8, Dowex 21K, Dowex 2X–8, etc. The catalyst is prepared, as hereinbefore set forth, by contacting an aqueous solution of molybdenum (VI) oxalate with the anion exchange resin which acts as a support therefor in an appropriate apparatus. The contact of the organometallic compound and the ion exchange resin will be effected at temperatures ranging from about ambient to about 100° C. or more accompanied by complete admixture of the two components of the catalyst so that an anion exchange is made and the molybdenum (VI) oxalate is chemically bonded to the ion exchange resin. After thorough admixture of the two components for a period which may range from about 0.5 up to about 6 hours or more in duration, the ion exchange resin containing the impregnated molybdenum (VI) oxalate will be recovered and washed with water to remove any soluble molybdenum compounds which may be on the surface of the ion exchange resin, dried in a stream of air and recovered. The molybdenum (VI) oxalate will be chemically bonded to the ion exchange resin in such an amount so that the molybdenum (VI) oxalate will be present in a range of from about 1% to about 50% by weight of the finished catalyst composite.

The catalyst which is thus prepared according to the above paragraph may then be utilized to effect the reaction of an olefin with water to form alcohols. Examples of olefinic compounds which may undergo hydration by utilizing the catalytic composition of matter of the present invention will include those olefins containing from 2 to about 30 carbon atoms in length, said compounds being both mono- and poly-olefinic in nature. Some specific examples of these olefins will include ethylene, propylene, 1-butene, 2-butene, 1-pentene, 2-pentene, 1-hexene, 2-hexene, 3-hexene, 1-heptene, 2-heptene, 3-heptene, 1-octene, 2-octene, 3-octene, 4-octene, 1-nonene, 2-nonene, 3-nonene, 4-nonene, 1-decene, 2-decene, 3-decene, 4-decene, 5-decene, 3-methyl-1-butene, 3-methyl-1-pentene, 3-methyl-2-pentene, 3-methyl-1-hexene, 3-methyl-1-heptene, 4-methyl-2-heptene, 3-methyl-1-octene, 1,3-butadiene, 1,3-pentadiene, 1,3-hexadiene, 2,4-hexadiene, 1,3-heptadiene, 2,4-heptadiene, 1,3-octadiene, 2,4-octadiene, 4-methyl-1,3-hexadiene, etc.; aromatic compounds containing an unsaturated side chain such as styrene, 3-phenylpropene-1, 4-phenylbutene-1, 5-phenylpentene-1, 5-phenylhexene-1, etc. In addition it is also contemplated within the scope of this invention that steroids and similar compounds such as cholesterol, stigmasterol, ergosterol, etc. may also undergo hydration utilizing a catalyst of the type hereinbefore set forth in greater detail. It is to be understood that the aforementioned olefins are only represenative of the class of reactants which may be used to effect the desired hydration and that the present invention is not necessarily limited thereto.

The desired hydration process utilizing the novel catalyst of the present invention may be effected in any suitable manner and may comprise either a batch or continuous type of operation. For example, when a batch type operation is used, a quantity of the olefinic hydrocarbon, if in liquid form, is placed in an appropriate apparatus along with water. In addition, the macromolecular catalyst comprising molybdenum (IV) oxalate chemically bonded to an anion exchange resin is also placed in the apparatus. In the event that the olefin is in gaseous form, such as when hydrating ethylene, propene, butene-1, or butene-2, the reaction vessel will comprise an autoclave or other pressure-resistant vessel whereby the olefin is charged to the vessel containing the water. If pressures greater than autogenic are to be employed, air or a substantially inert gas such as nitrogen may be charged to the reactor which is thereafter heated to the desired temperature, the operating pressures which are utilized being those which are sufficient to maintain a major portion of the reactants in the liquid phase. The reactor is maintained at the predetermined operating temperature which may range from about 0° to about 300° C. and a pressure which may range from atmospheric to about 2000 pounds per square inch for a residence time which may range from about 0.5 up to about 20 hours or more in duration. Upon completion of the aforementioned residence time, heating or cooling is discontinued and the reactor is allowed to return to room temperature. The excess pressure, if any, is discharged, the reactor is opened, and the reaction mixture is recovered therefrom. After separation from the catalyst by relatively simple means such as decantation, filtration, etc. the liquid mixture is then subjected to conventional means of purification such as washing, drying, distillation, crystallization, etc. whereby the desired alcohol is separated from water as well as unreacted olefins and recovered.

It is also contemplated within the scope of this invention that the novel catalytic composition of matter of the present invention may also be employed when the hydration reaction is effected in a continual manner. When such a type of operation is used, the reactor containing the molybdenum (VI) oxalate chemically bonded to an anion exchange resin is maintained at the proper operating conditions of temperature and pressure. The olefinic charge stock and the water are continuously charged to the reactor through separate lines or, if so desired, they may be admixed prior to entry into said reactor and the resulting mixture passed through the reactor in a single stream. After completion of the desired residence time, the reactor effluent is continuously withdrawn and subjected to conventional means of separation whereby the desired alcohol is recovered and passed to storage while any unreacted starting material may be recycled to form a portion of the feed stock. Inasmuch as the catalyst is in solid form and is not soluble in the thus formed alcohol it is possible to employ various types of continuous manners of operation. One such type of operation is the fixed bed type in which the catalyst is maintained as a fixed bed in the reactor and reactants are passed therethrough in either an upward or downward flow. Another type of operation which may be employed is the moving bed method in which the catalyst and the reactants are passed through the reactor either concurrently or countercurrently to each other. Yet another type of operation which may be employed comprises the slurry type of operation in which the catalyst is carried into the reactor as a slurry in one or both of the reactants.

The following examples are given to illustrate the use of a novel composition of matter of the present invention which, however, are not intended to limit the generally broad scope of the present invention in strict accordance therewith.

EXAMPLE I

A novel macromolecular organometallic catalyst is prepared by contacting 10 grams of an anion exchange resin which comprises a styrene-divinylbenzene copolymer containing an amine group and known in the trade as Dowex 1-X8 with 25 cc. of an aqueous solution of molybdenum (VI) oxalate, said aqueous solution containing 5% molybdenum (VI) oxalate at ambient temperature in a flask provided with stirring means. The mixture is agitated for a period of 2 hours after which time the aqueous solution of uncombined molybdenum (VI) oxalate is separated from the resin by filtration. The resin is then washed with deionized water to remove any soluble molybdenum (VI) oxalate which still may be present on the surface of the resin and thereafter the resin containing the chemically bonded molybdenum (VI) oxalate is dried at a temperature of about 150° C. in a stream of nitrogen for a period of 2 hours.

In the glass liner of a rotating autoclave is placed 1.0 gram of a macromolecular organometallic catalyst which is prepared according to the above paragraph, along with 40.0 grams of water. The autoclave is sealed and 42.0 grams of propylene are charged thereto. In addition, nitrogen is also charged to the autoclave so that an initial operating pressure of 700 pounds per square inch is reached; following which the autoclave is heated to a temperature of about 150° C. and maintained thereat for a period of 12 hours. At the end of the 12-hour period, heating is discontinued, the autoclave is allowed to return to room temperature and the excess pressure is discharged therefrom. The autoclave is opened, the reaction mixture is recovered, separated from the catalyst by means of filtration and subjected to conventional means of purification whereby the desired product comprising isopropyl alcohol is recovered.

EXAMPLE II

In this example, 10 grams of a styrene-divinylbenzene copolymer anion exchange resin in the basic form is contacted with 100 cc. of an aqueous molybdenum (VI) oxalate solution containing 10% molybdenum (VI) oxalate. The contact is made at ambient temperature with thorough admixing for a period of 0.5 hour. At the end of this time the excess aqueous solution of molybdenum (VI) oxalate is removed by filtration and the resin is washed with deionized water. The washed ion exchange resin containing molybdenum (VI) oxalate bonded thereto is dried in a stream of air at a temperature of 150° C. for a period of 2 hours. Following this, 1 gram of the catalyst which has been thus prepared is placed in the glass liner of a rotating autoclave along with 40.0 grams of water. The autoclave is sealed and 40.0 grams of isobutylene is charged thereto along with a sufficient amount of air so that an initial operating pressure of 750 pounds per square inch is reached. The autoclave is then heated to a temperature of 150° C. and maintained thereat for a period of 6 hours. At the end of the 6-hour period, heating is discontinued and the autoclave is allowed to return to room temperature. The excess pressure is discharged, the autoclave is opened and the reaction mixture is recovered therefrom. Following separation of the catalyst from reaction mixture by means of filtration, the latter is then subjected to conventional means of separation and purification such as washing, drying, fractional distillation under reduced pressure, etc. whereby the desired product comprising t-butyl alcohol is recovered.

EXAMPLE III

To 10 grams of a styrene-divinylbenzene copolymeric matrix which is known in the trade as Dowex 21K is added 200 cc. of an aqueous solution of molybdenum (VI) oxalate containing 5% molybdenum (VI) oxalate. The mixture is thoroughly stirred in a flask provided with stirring and heating means at a temperature of 50° C. for a period of 2.0 hours. At the end of this time, heating is discontinued and the excess aqueous solution of molybdenum (VI) oxalate is removed by filtration and the anion exchange resin containing chemically bonded molybdenum (VI) oxalate is washed twice with 100 cc. of water. The thus washed anion exchange resin is thereafter dried by being heated at a temperature of 150° C. in a stream of air for a period of 2 hours. Following this 1.0 gram of the novel catalytic composition of matter of the present invention is then placed in the glass liner of a rotating autoclave along with 40.0 grams of water. The autoclave is sealed and 40.0 grams of 1-pentene is charged thereto. Upon completion of the addition of the pentene the autoclave is then heated to a temperature of 150° C. and maintained thereat for a period of 8 hours. At the end of this 8-hour period, heating is discontinued and the autoclave is allowed to return to room temperature. The autoclave is opened and the reaction mixture is separated from the solid catalyst by means of filtration. Thereafter the liquid reaction product is washed, dried and subjected to frictional distillation whereby the desired product comprising sec-amyl alcohol is separated and recovered.

I claim as my invention:

1. A catalytic composition of matter comprising molybdenum (VI) oxalate chemically bonded to an amine substituted styrene-divinylbenzene copolymeric matrix, said molybdenum (VI) oxalate being present in an amount of from about 1 to 50% by weight of said catalytic composition of matter.

2. A process for the preparation of the catalytic composition of matter set forth in claim 1 which comprises contacting an amine substituted styrene-divinylbenzene copolymeric matrix with an aqueous solution of molybdenum (VI) oxalate at a temperature of from about ambient to about 100° C., thereafter washing said resin free of soluble molybdenum compound, drying and recovering the resultant solid catalytic composition of matter.

No references cited.

MELVIN GOLDSTEIN, Primary Examiner

U.S. Cl. X.R.

260—2.1 R, 618 R, 631 R, 641